US010508594B2

(12) United States Patent
Yanai et al.

(10) Patent No.: US 10,508,594 B2
(45) Date of Patent: Dec. 17, 2019

(54) ACTUATOR FOR LINK MECHANISM FOR INTERNAL COMBUSTION ENGINE

(71) Applicant: HITACHI AUTOMOTIVE SYSTEMS, LTD., Hitachinaka-shi, Ibaraki (JP)

(72) Inventors: Kotofumi Yanai, Utsunomiya (JP); Kishiro Nagai, Atsugi (JP); Junichiro Onigata, Atsugi (JP)

(73) Assignee: HITACHI AUTOMOTIVE SYSTEMS, LTD., Hitachinaka-Shi (JP)

( * ) Notice: Subject to any disclaimer, the term of this patent is extended or adjusted under 35 U.S.C. 154(b) by 0 days.

(21) Appl. No.: 16/075,583

(22) PCT Filed: Jan. 30, 2017

(86) PCT No.: PCT/JP2017/003133
§ 371 (c)(1),
(2) Date: Aug. 3, 2018

(87) PCT Pub. No.: WO2017/141673
PCT Pub. Date: Aug. 24, 2017

(65) Prior Publication Data
US 2019/0063310 A1 Feb. 28, 2019

(30) Foreign Application Priority Data
Feb. 16, 2016 (JP) .................................. 2016-026513

(51) Int. Cl.
*F02B 75/04* (2006.01)
*F02B 75/32* (2006.01)
(Continued)

(52) U.S. Cl.
CPC ............ *F02B 75/045* (2013.01); *F02B 75/04* (2013.01); *F02B 75/048* (2013.01); *F02B 75/32* (2013.01); *F16H 1/32* (2013.01); *F16H 49/001* (2013.01)

(58) Field of Classification Search
CPC ...... F02B 75/045; F02B 75/048; F02B 75/04; F02B 75/32; F16H 49/001; F16H 1/32
See application file for complete search history.

(56) References Cited

U.S. PATENT DOCUMENTS 4,669,578 A * 6/1987 Fukamachi ........... F16K 31/043
185/40 R
5,484,345 A * 1/1996 Fukaya ................. F16H 37/041
475/162
(Continued)

FOREIGN PATENT DOCUMENTS

JP H04-347036 A 12/1992
JP 2004-019936 A 1/2004
(Continued)

*Primary Examiner* — Hung Q Nguyen
(74) *Attorney, Agent, or Firm* — Foley & Lardner LLP

(57) ABSTRACT

Provided is an actuator for a link mechanism for an internal combustion engine, which can be prevented from being increased in size in an axial direction. The actuator for a link mechanism for an internal combustion engine of the present invention includes: a wave gear type speed reducer configured to reduce a rotation speed of an electric motor, and to transmit the rotation speed to the control shaft; and a housing to which the electric motor and the wave gear type speed reducer are fixed, the wave gear type speed reducer including: an inner gear, which is fixed to the housing, has inner teeth meshed with the flexible outer gear, and is made of an iron-based metal material, the actuator including a stopper mechanism, which is provided to each of the inner gear and the control shaft, and is configured to restrict relative rota- (Continued)

tion of a predetermined amount or more when the inner gear and the control shaft are held in abutment against each other.

15 Claims, 6 Drawing Sheets

(51) Int. Cl.
*F16H 1/32* (2006.01)
*F16H 49/00* (2006.01)

(56) References Cited

U.S. PATENT DOCUMENTS

| 2005/0184265 A1 | 8/2005 | Aoki et al. |
| 2018/0016972 A1 | 1/2018 | Nagai et al. |

FOREIGN PATENT DOCUMENTS

| JP | 2011-169152 A | 9/2011 |
| JP | 2016-138467 A | 8/2016 |

* cited by examiner

ACTUATOR FOR LINK MECHANISM FOR INTERNAL COMBUSTION ENGINE

TECHNICAL FIELD

The present invention relates to an actuator for, for example, a link mechanism to be used for a variable valve mechanism configured to variably change operating characteristics of an engine valve of an internal combustion engine, or a link mechanism to be used for a variable compression ratio mechanism configured to variably change a mechanical actual compression ratio of the internal combustion engine.

BACKGROUND ART

Hitherto, a technology disclosed in Patent Literature 1 has been known as a variable compression ratio mechanism. According to Patent Literature 1, a multi-link type piston-crank mechanism are used to change stroke characteristics of a piston so that a mechanical compression ratio of an internal combustion engine can be changed. Specifically, the piston and a crankshaft are coupled to each other through intermediation of an upper link and a lower link. A posture of the lower link is controlled by an actuator including a drive motor, a speed reducer, or the like. In this manner, the stroke characteristics of the piston are changed to control the engine compression ratio. Further, according to Patent Literature 1, a piece portion formed on a second control shaft is brought into abutment against a wall surface of a housing, to thereby restrict a movable range.

CITATION LIST

Patent Literature

[PTL 1] JP 2011-169152 A

SUMMARY OF INVENTION

Technical Problem

However, in the technology described in Patent Literature 1, in order to ensure the strength with respect to an output from the motor side, it is required that the stopper and the piece portion of the second control shaft each have a large size. Thus, a length of the actuator becomes larger in the axial direction, and hence there is a fear in in that ease of layout is degraded.

The present invention has been made in view of the problem described above, and has an object to provide an actuator for a link mechanism for an internal combustion engine, which can be prevented from being increased in size in an axial direction.

Solution to Problem

In order to achieve the above-mentioned object, according to one embodiment of the present invention, there is provided an actuator for a link mechanism for an internal combustion engine, which includes: a wave gear type speed reducer configured to reduce a rotation speed of an electric motor, and to transmit the rotation speed to the control shaft; and a housing to which the electric motor and the wave gear type speed reducer are fixed, the wave gear type speed reducer including an inner gear, which is fixed to the housing, has inner teeth meshed with the flexible outer gear, and is made of an iron-based metal material, the actuator including a stopper mechanism, which is integrally provided to each of the inner gear and the control shaft, and is configured to restrict relative rotation of a predetermined amount or more when the inner gear and the control shaft are held in abutment against each other.

Advantageous Effects of Invention

The stopper mechanism is formed between the inner gear and the control shaft each made of an iron-based metal material. Thus, as compared to a case in which a stopper mechanism is constructed by a member made of an aluminum-based metal material, reduction in size in the axial direction and a radial direction can be achieved.

DESCRIPTION OF EMBODIMENTS

First Embodiment

Figure 1:
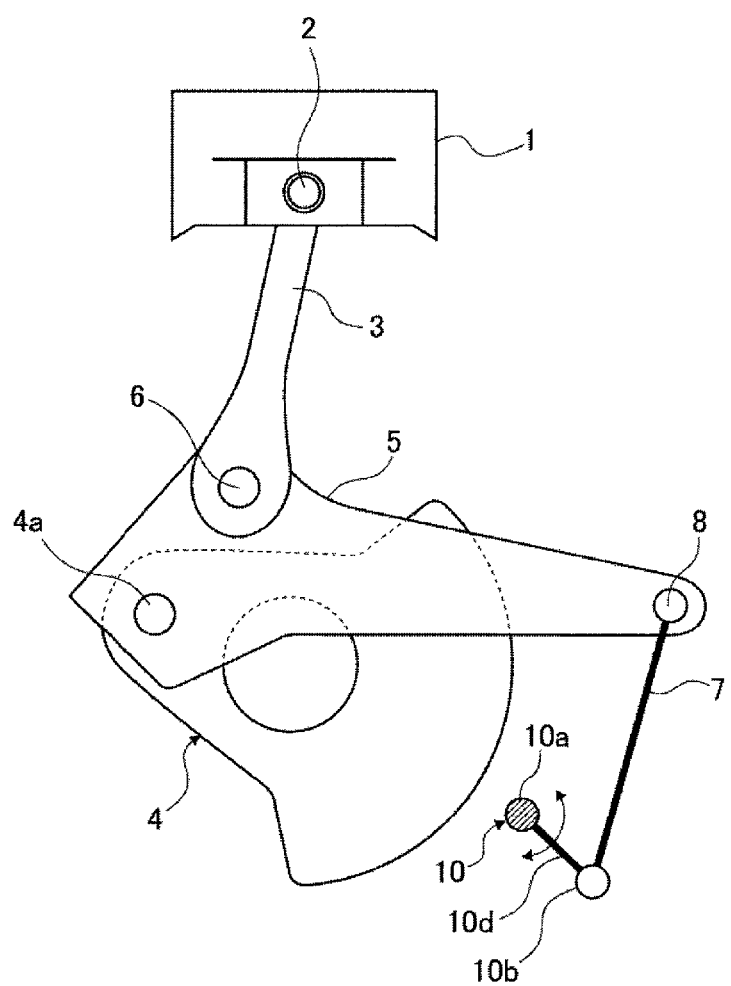
FIG. 1 is a schematic view of an internal combustion engine including an actuator for a link mechanism for an internal combustion engine according to the present invention.

FIG. 1 is a schematic view of an internal combustion engine including an actuator for a link mechanism for an internal combustion engine according to the present invention. A basic configuration is the same as the multi-link type piston-crank mechanism illustrated in FIG. 1 of Japanese Patent Public Disclosure [kokai] No. 2011-169152, and therefore is briefly described. An upper end of an upper link 3 is coupled to a piston 1, which moves in a reciprocating manner inside a cylinder of a cylinder block of an internal combustion engine, through intermediation of a piston pin 2 so as to be freely rotatable. A lower link 5 is coupled to a lower end of the upper link 3 through intermediation of a coupling pin 6 so as to be freely rotatable. A crankshaft 4 is coupled to the lower link 5 through intermediation of a crank pin 4a so as to be freely rotatable. Further, an upper end portion of a first control link 7 is coupled to the lower link 5 through intermediation of a coupling pin 8 so as to be freely rotatable. A lower end portion of the first control link 7 is coupled to a first control shaft 10.

The control shaft 10 is provided so as to extend in parallel to the crankshaft 4 provided so as to extend in a cylinder bank direction inside the internal combustion engine. The first control shaft 10 includes a first journal portion 10a supported on an internal combustion engine main body so as to be freely rotatable, and a control eccentric shaft portion 10b to which the lower end portion of the first control link 7 is coupled so as to be freely rotatable. A first arm portion 10d has one end coupled to the first journal portion 10a and another end coupled to the lower end portion of the first control link 7. The control eccentric shaft portion 10b is provided at a position deviated by a predetermined amount with respect to the first journal portion 10a.

A rotational position of the first control shaft 10 is changed by a torque transmitted from a drive motor 22 through intermediation of a wave gear type speed reducer 21 being a part of the actuator for a link mechanism for an internal combustion engine. When the rotational position of the first control shaft 10 is changed, a posture of the first control link 7 is changed. In this manner, a posture of the lower link 5 is changed to change a stroke position or a stroke amount of the piston 1 inside the cylinder. Along with the change, an engine compression ratio is changed.

(Configuration of Actuator for Link Mechanism for Internal Combustion Engine)

Figure 2:
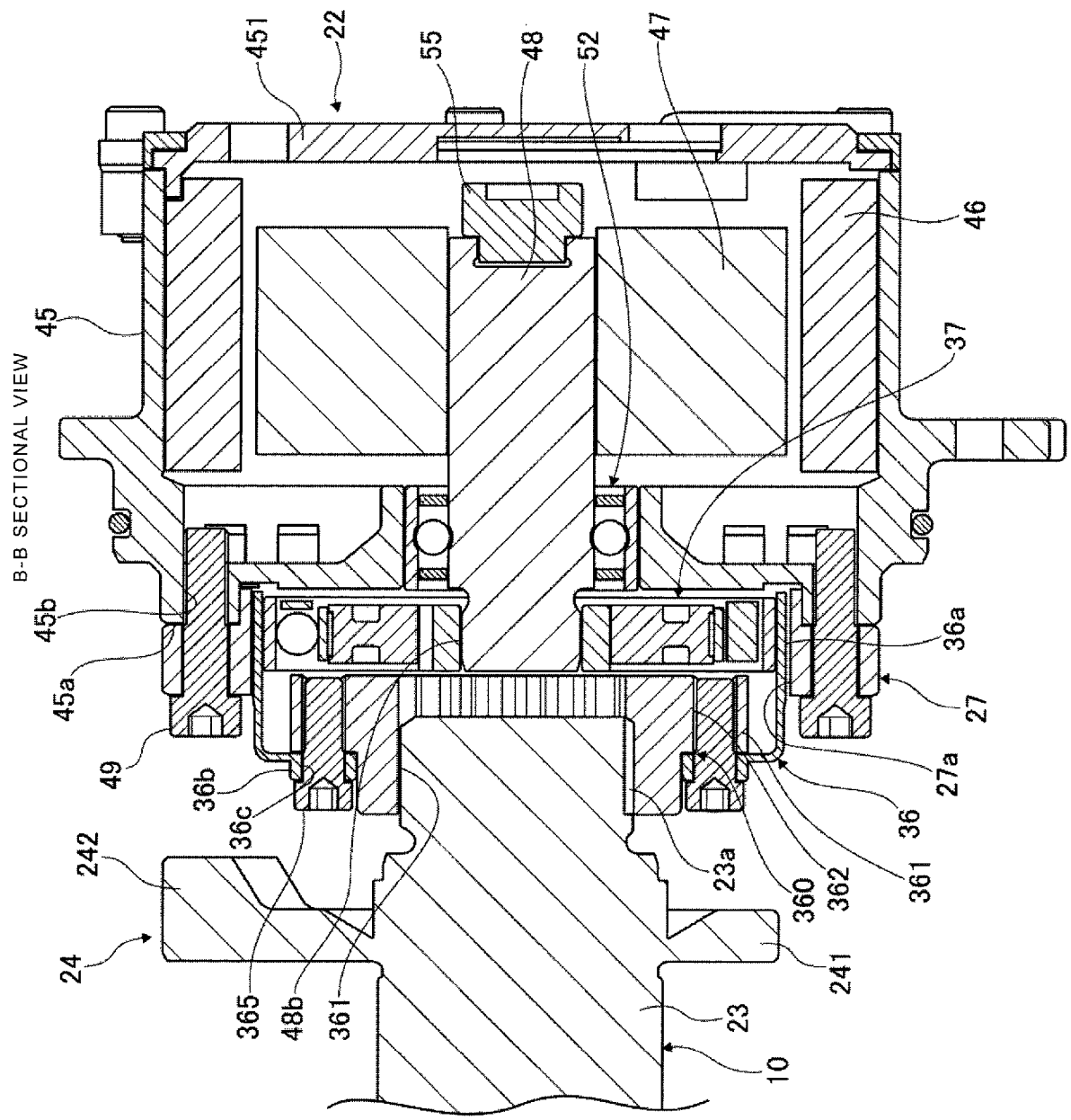
FIG. 2 is a sectional view of a main part of the actuator for a link mechanism for an internal combustion engine according to a first embodiment of the present invention, which is taken along the line B-B.
Figure 3:
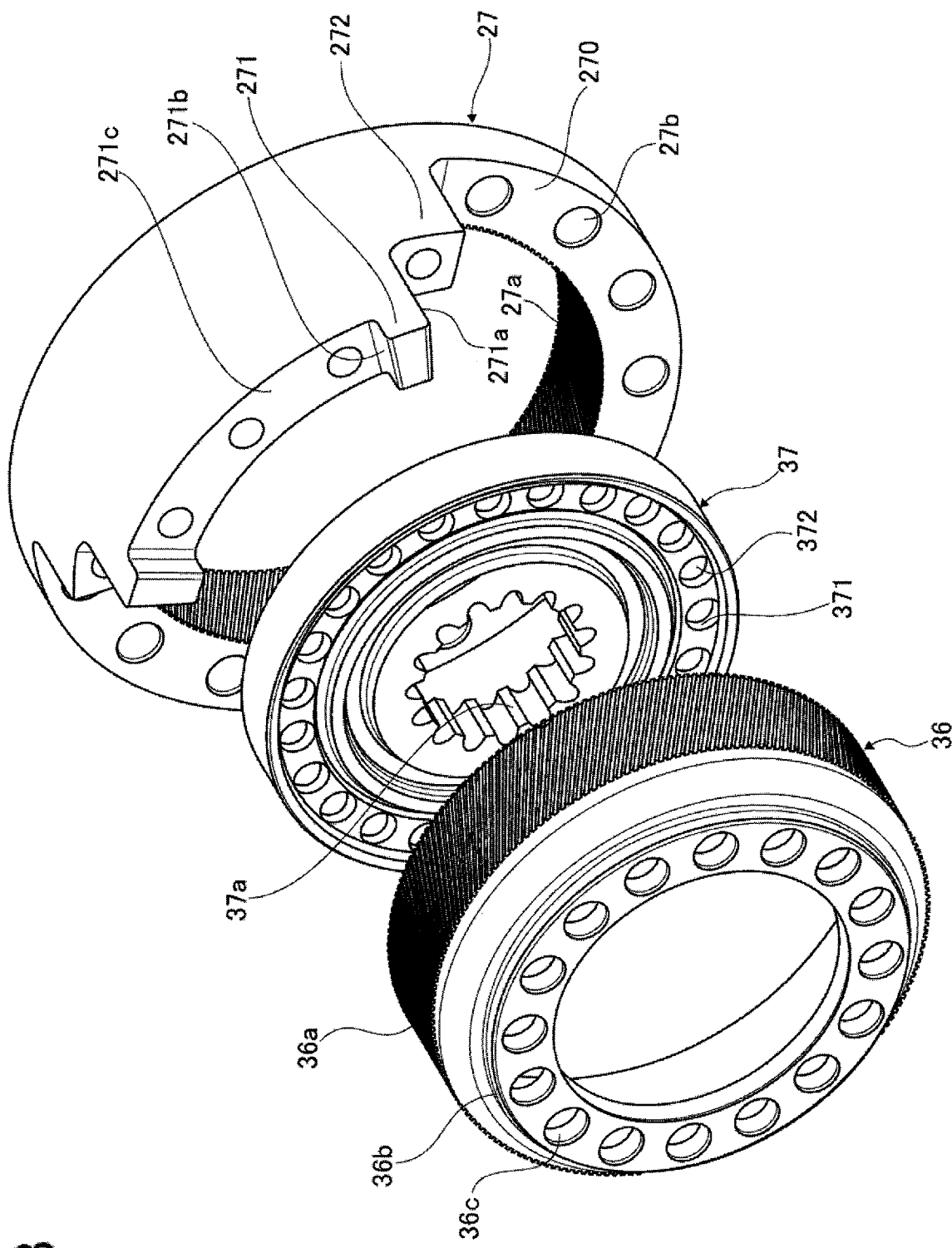
FIG. 3 is an exploded perspective view of a wave gear type speed reducer of the first embodiment.
Figure 4:
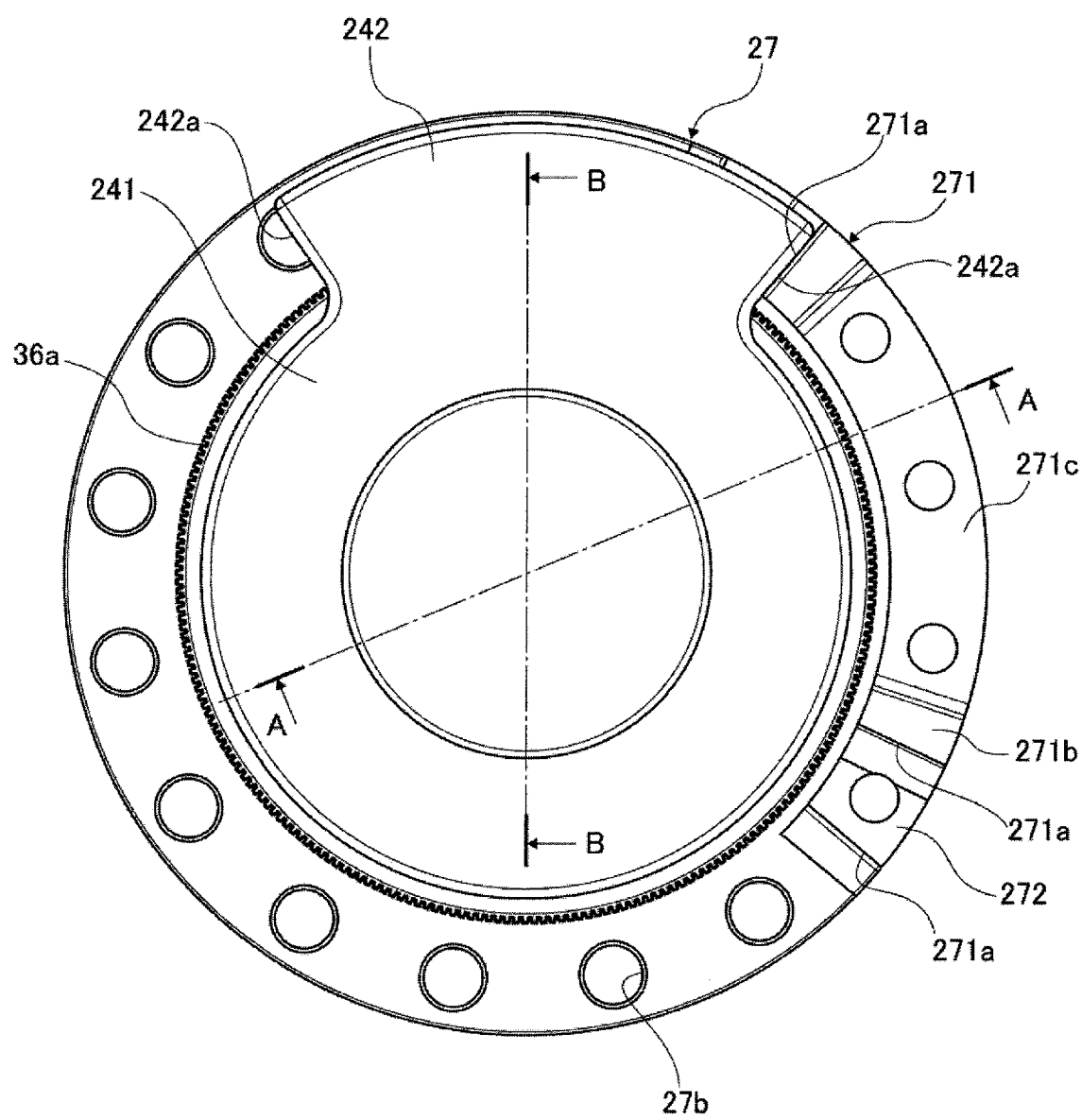
FIG. 4 is a view of the actuator for a link mechanism for an internal combustion engine according to the first embodiment as viewed from a stopper engagement portion side.

FIG. 2 is a sectional view of a main part of the actuator for a link mechanism for an internal combustion engine according to a first embodiment of the present invention, which is taken along the line B-B illustrated in FIG. 4. FIG. 3 is an exploded perspective view of the wave gear type speed reducer of the first embodiment. The actuator for a link mechanism for an internal combustion engine includes the drive motor 22, the wave gear type speed reducer 21 mounted to a distal end side of the drive motor 22, and the first control shaft 10 connected to the wave gear type speed reducer 21.

(Configuration of Drive Motor)

The drive motor 22 is a brushless motor, and includes a motor casing 45, a lid member 451, a coil 46, a rotor 47, a motor drive shaft 48, and a rotor 55 for a sensor. The motor casing 45 has a bottomed cylindrical shape opened at one end. The lid member 451 is configured to close an opening of the motor casing 45, and includes a rotation angle sensor configured to detect an angle of rotation of a rotor 55 for a resolver described later. The coil 46 has a tubular shape, and is fixed onto an inner peripheral surface of the motor casing 45. The rotor 47 is provided inside the coil 46 so as to be freely rotatable. The motor drive shaft 48 has one end portion 48a fixed at the center of the rotor 47. The rotor 55 for a sensor is configured to rotate integrally with the motor drive shaft 48. The motor drive shaft 48 is supported so as to be rotatable by a bearing 52 arranged inside a cylindrical portion formed at a center of a bottom portion of the motor casing 45. The motor casing 45 is made of an aluminum-based metal material (may be made of an iron-based metal material), and includes boss portions 45a on an outer periphery of the cylindrical portion being the bottom portion. On the boss portions 45a, male thread portions 45b with which the bolts 49 are threadedly engaged are formed.

(Configuration of First Control Shaft)

The first control shaft 10 includes a shaft portion main body 23 and a stopper engagement portion 24. The shaft portion main body 23 extends in an axial direction. The stopper engagement portion 24 is radially extended from the shaft portion main body 23. FIG. 4 is a view of the actuator for a link mechanism for an internal combustion engine according to the first embodiment as viewed from the stopper engagement portion side. The stopper engagement portion 24 includes a first diameter radially-expanded portion 241 and a second radially-expanded portion 242. The first radially-expanded portion 241 is radially expanded in a radial direction. The second radially-expanded portion 242 is radially expanded more on the radially outer side than the first radially-expanded portion 241. End surfaces 242a of the second radially-expanded portion 242 are end surfaces that are parallel to an imaginary line extending in the radial direction from a rotation axis, in other words, orthogonal to a tangent line to an imaginary circle about the rotation axis as a center. The end surfaces 242a are held in abutment against circumferential end surfaces 271a of a stopper 271 described later, to thereby restrict rotation of the first control shaft 10. In the first control shaft 10, the shaft portion main body 23 and the stopper engagement portion 24 are formed integrally with each other using an iron-based metal material. Therefore, the number of components is reduced, and in addition, accuracy of a relative positional relationship between a rotation position of the first control shaft 10 and the stopper engagement portion 24 is enhanced. The shaft portion main body 23 has a level-difference shape in the axial direction, and includes a spline portion 23a that is formed on the wave gear type speed reducer 21 side with respect to the stopper engagement portion 24 and is connected to outer teeth 36a of the wave gear type speed reducer 21.

(Configuration of Wave Gear Type Speed Reducer)

The wave gear type speed reducer 21 is mounted to the bottom portion side of the motor casing 45. The wave gear type speed reducer 21 includes an inner gear 27, a flexible outer gear 36, and a wave generating device 37. The inner gear 27 has an annular shape, and has a plurality of inner teeth 27a formed on an inner periphery thereof. The flexible outer gear 36 is arranged on the radially inner side with respect to the inner gear 27. The flexible outer gear 36 is flexurally deformable, and has the outer teeth 36a formed on the outer peripheral surface, which are meshed with the inner teeth 27a. The wave generating device 37 is formed into an ellipsoidal shape, and has an outer peripheral surface that is slidable along an inner peripheral surface of the flexible outer gear 36.

On an outer peripheral side of the inner gear 27, there are formed thread holes 27b at equiangular positions, into which the bolts 49 are respectively inserted. Also on the bottom portion of the motor casing 45, the male thread portions 45b are formed at positions corresponding to the thread holes 27b, and the inner gear 27 is fixed to the motor casing 45 with the bolts 49. The inner gear 27 is made of an iron-based metal material, and includes the annular portion 270, a stopper reinforcing portion 272, and the stopper 271. The annular portion 270 has an annular shape, and has the inner teeth 27a on an inner periphery thereof. The stopper reinforcing portion 272 extends integrally with the annular portion 270 in the axial direction in an angular range of about 90° of the annular portion 270. The stopper 271 integrally extends with the stopper reinforcing portion 272 in the axial direction in an angular displacement of about 60° in the stopper reinforcing portion 272.

Figure 5:
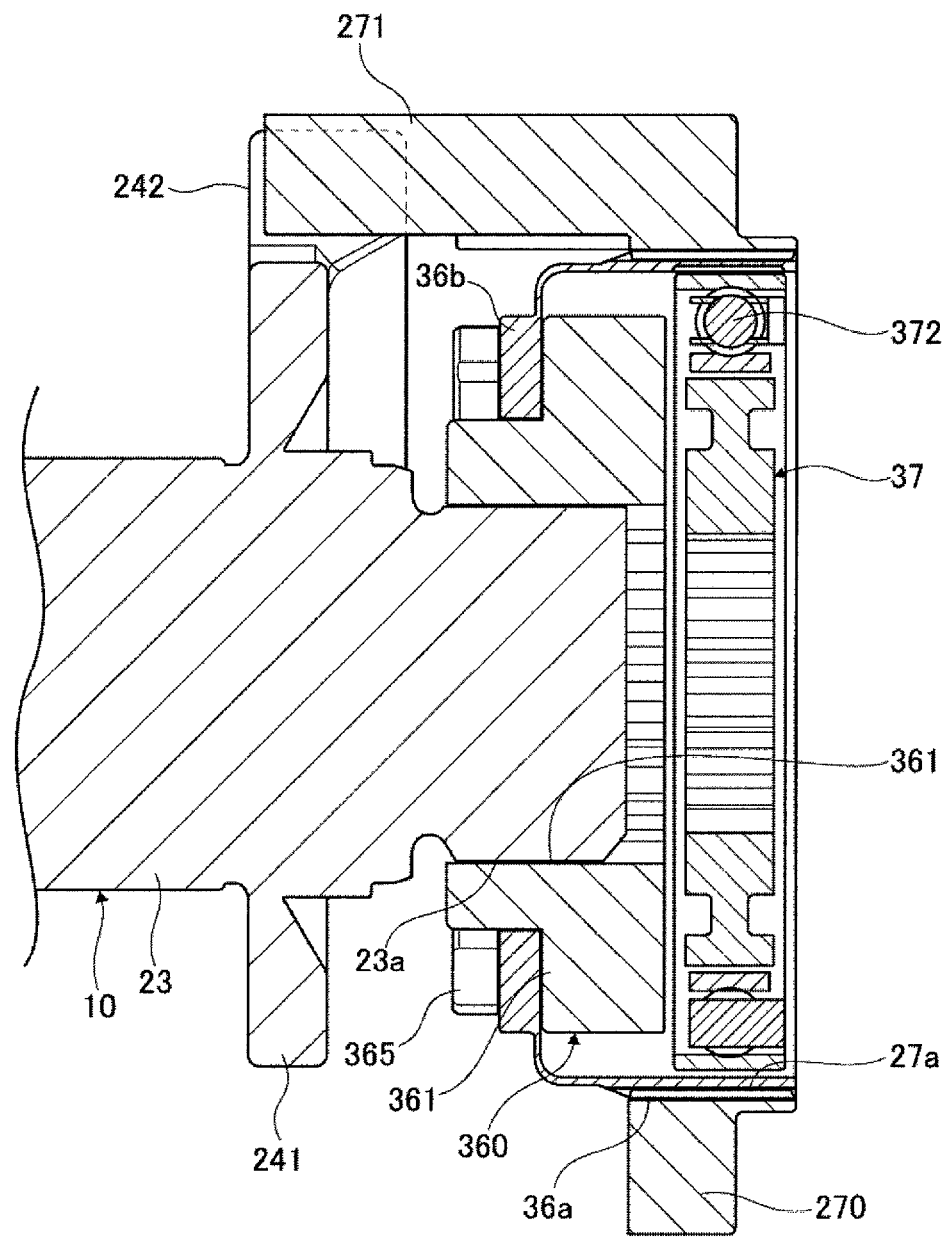
FIG. 5 is a sectional view of a main part of the actuator for a link mechanism for an internal combustion engine according to the first embodiment, which is taken along the line A-A.

FIG. 5 is a sectional view of a main part of the actuator for a link mechanism for an internal combustion engine according to the first embodiment, which is taken along the line A-A illustrated in FIG. 4. At the time the stopper 271 is extended from the annular portion 270 to an axial position of being engageable with the stopper engagement portion 24, when only the region of the stopper 271 is extended in the axial direction, there is a fear in that cracking may occur between the annular portion 270 and the stopper 271 due to stress concentration. Thus, the stopper reinforcing portion 272 is formed so that a force acting on the stopper 271 is received in a wider range with respect to the annular portion 270. With this, cracking due to stress concentration is prevented. The stopper 271 is provided on the inner gear 27 made of an iron-based metal material. Therefore, as compared to a case in which stoppers are formed, for example, on a housing made of an aluminum-based metal material, the strength of the stopper 271 can be secured, and increase in size can be prevented. That is, the strength is required, and hence the stopper 271 is provided on the inner gear 27 made of iron-based metal so that the strength of the stopper 271 can be secured. Further, the inner gear 27 has the thread holes 27b through which the respective bolts 49 pass, and is fixed to the motor casing 45 with the bolts 49. Thus, the coupling strength with respect to the motor casing 45 is larger than in a case in which only the stopper 271 is mounted to the motor casing 45.

The thread holes 27b are similarly formed also in the stopper 271 and the stopper reinforcing portion 272. On an axial distal end portion of the stopper 271, there are formed a bolt pedestal portion 271c and stopper portions 271b. The bolt pedestal portion 271c is recessed by the degree substantially corresponding to the thickness of the head portions of the bolts 49. The stopper portions 271b are formed so as to project in the axial direction on both sides of the bolt pedestal portion 271c in the circumferential direction. With this, the bolts 49 are prevented from excessively projecting in the axial direction. The circumferential end surfaces 271a of the stopper 271 are end surfaces parallel to the imaginary line extending in the radial direction from the rotation axis, and are held in abutment against the circumferential end surfaces 242a of the above-mentioned second radially-expanded portion 242, to thereby restrict rotation of the first control shaft 10.

The flexible outer gear 36 is made of an iron-based metal material. The flexible outer gear 36 has a bottomed cylindrical shape with a bottom portion 36b. The cylindrical shape portion having outer teeth 36a is formed as a flexurally deformable cylindrical shape member having a small thickness. In the bottom portion 36b, a plurality of bolt holes 36c that are penetrated in the axial direction are formed on the circumference. The flexible outer gear 36 is engaged with the first control shaft 10 through intermediation of a coupling member 360. The coupling member 360 is a cylindrical member including a spline 361 on an inner periphery thereof, and the spline 361 is meshed with the spline portion 23a of the first control shaft 10. The coupling member 360 includes a flange portion 361 radially expanded toward the outer peripheral side. The flange portion 361 includes male thread portions 362 that are penetrated in the axial direction, and are threadedly engaged with bolts 365. The coupling member 360 is integrally engaged with the flexible outer gear 36 by the bolts 365. The number of the outer teeth 36a of the flexible outer gear 36 is smaller than the number of the inner teeth 27a of the inner gear 27 by two. In a wave gear type speed reducing mechanism, a speed reduction ratio is determined based on a difference between the numbers of teeth. Thus, an extremely large speed reduction ratio is obtained.

The wave generating device 37 includes a main body portion 371 and ball bearings 372. The main body portion 371 has an ellipsoidal shape. The ball bearings 372 are configured to allow relative rotation between an outer periphery of the main body portion 371 and an inner periphery of the flexible outer gear 36. In a center of the main body portion 371, a through hole 37a is formed. Serration is formed on an inner periphery of the through hole 37a, and is coupled through serration coupling to serration formed on an outer periphery of another end portion 48b of the motor drive shaft 48. The serrations may be coupled using a key groove or through spline coupling, and the method of coupling is not particularly limited.

(Configuration of Stopper)

As illustrated in FIG. 5, the stopper mechanism includes the stopper engagement portion 24 and the stopper 271. The stopper engagement portion 24 includes the first radially-expanded portion 241 and the second radially-expanded portion 242. The second radially-expanded portion 242 is formed so as to have a thickness in the axial direction larger than the first radially-expanded portion 241. In other words, the second radially-expanded portion 242 is an extending portion that extends radially outward from the first control shaft 10, and has a radially outer side that extends toward the drive motor side of the drive motor 22 in the rotation axis direction. The stopper 271 is an extending portion that extends toward the first control shaft side in the rotation axis direction of the drive motor 22. That is, the stopper 271 and the stopper engagement portion 24 are extended so as to approach each other in the axial direction. With this, it is possible to prevent such a situation that only one of the stopper 271 and the stopper engagement portion 24 is extended excessively so that an excessive moment is applied, thereby being capable of achieving reduction in size and weight of the stopper mechanism. Further, as viewed from the radially outer side of the first control shaft 10, the stopper 271 is formed so as to overlap with the cylindrical shape portion having the outer teeth 36a of the flexible outer gear 36 are formed thereon the bottom portion 36b, thereby reducing the size in the axial direction.

Effects of First Embodiment

Effects produced by the actuator for a link mechanism for an internal combustion engine described in the first embodiment are now listed below.

(1) An actuator for a link mechanism for an internal combustion engine, which is configured to rotate a first control shaft 10 (control shaft) configured to change a posture of the link mechanism of the internal combustion engine, includes: a wave gear type speed reducer 21 configured to reduce a rotation speed of a drive motor 22 (electric motor), and to transmit the rotation speed to the first control shaft 10; and a motor casing 45 (housing) to which the drive motor 22 and the wave gear type speed reducer 21 are fixed, the wave gear type speed reducer 21 including: a wave generating device 37 having an ellipsoidal-shaped contour coupled to an output shaft of the drive motor 22; a flexible outer gear 36, which is configured to rotate integrally with the first control shaft 10, has outer teeth 36a formed on an outer periphery thereof, and includes a cylindrical portion that extends through an outer peripheral side of the wave generating device 37; an inner gear 27, which is fixed to the motor casing 45, has inner teeth 27a meshed with the outer teeth 36a of the flexible outer gear 36, and is made of an iron-based metal material, the actuator including a stopper mechanism, which is provided to each of the inner gear 27 and the first control shaft 10, and is configured to restrict relative rotation of a predetermined amount or more. The stopper mechanism is formed between the inner gear 27 and the first control shaft 10 each made of an iron-based metal material. Thus, as compared to a case in which a stopper mechanism is constructed by a member made of an aluminum-based metal material, reduction in size in the axial direction and the radial direction can be achieved.

(2) The stopper mechanism includes: a stopper 271 (first member), which is provided on the inner gear 27, and extends in a rotation axis direction of the drive motor 22 and toward the first control shaft side; and a stopper engagement portion 24 (second member), which is formed on the first control shaft 10, and is held in abutment against the stopper 271 when an amount of the relative rotation is the predetermined amount or more. Therefore, the first control shaft 10 being an object to be restricted can be directly restricted, thereby being capable of achieving reduction in size of the stopper mechanism.

(3) The stopper 271 overlaps with the cylindrical shape portion (cylindrical portion) of the flexible outer gear 36 as viewed form a radially outer side of the first control shaft 10. Therefore, reduction in size in the axial direction can be achieved.

(4) The link mechanism for an internal combustion engine is a compression rate variable device that is capable of changing stroke characteristics of a piston by a multi-link type piston-crank mechanism. Therefore, improvement in fuel efficiency can be achieved by the configuration in which the compression ratio of the internal combustion engine is variable.

(5) The stopper 271 is formed integrally with the inner gear 27. Therefore, the number of components can be reduced.

(6) The stopper engagement portion 24 is an extending portion that extends radially outward from the first control shaft 10, and has a radially outer side that extends toward the motor side in the rotation axis direction of the drive motor 22. Therefore, reduction in size of the stopper 271 can be achieved without extending the stopper 271 excessively.

(7) The inner gear 27 is fixed to the motor casing 45 with the plurality of bolts 49. Therefore, the inner gear 27 can be fixed stably.

(8) The motor casing 45 is made of an aluminum-based metal material. Therefore, reduction in weight can be achieved.

Second Embodiment

Figure 6:
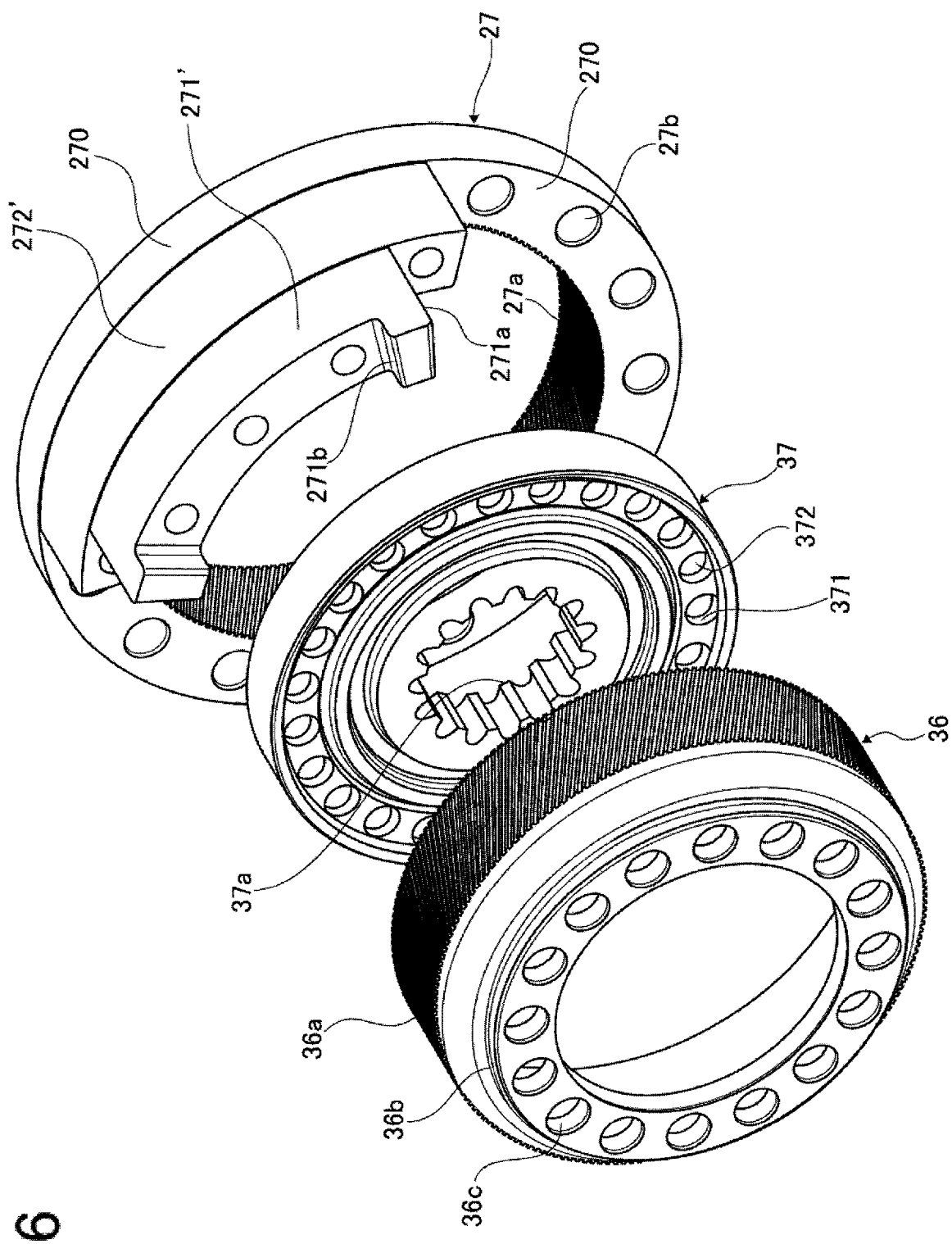
FIG. 6 is an exploded perspective view of a wave gear type speed reducer of a second embodiment of the present invention.

Next, a second embodiment of the present invention is described. A basic configuration is the same as that of the first embodiment, and therefore only differences are described. FIG. 6 is an exploded perspective view of a wave gear type speed reducer of the second embodiment. In the first embodiment, the stopper 271 is formed integrally with the inner gear 27. On the contrary, in the second embodiment, the inner gear 27 and the stopper 271 are formed as separate members, and when the inner gear 27 and the stopper 271 are to be fixed to the motor casing 45 with the bolts 49, the inner gear 27 and the stopper 271 are assembled together. With this, the inner gear 27 and the stopper 271 are integrated. Specifically, the inner gear 27 includes the annular portion 270, a stopper reinforcing member 272', and a stopper member 271'. The annular portion 270 has the inner teeth 27a foamed on the inner periphery thereof. The stopper reinforcing member 272' is arranged so as to extend in the axial direction in an angular range of about 90° of the annular portion 270. The stopper member 271' is arranged so as to extend in the axial direction in an angular displacement of about 60° in the stopper reinforcing member 272'. Those members are integrally assembled to the motor casing 45 with the bolts 49. With this, the annular portions 270 can be manufactured individually, and processing to be when the inner teeth 27a are formed is not complicated, thereby being capable of securing ease of manufacture.

Other Embodiments

Although the description has been given above based on each of the embodiments, another configuration may be employed without being limited to the embodiments described above. For example, although this actuator for a link mechanism for an internal combustion engine is employed for the mechanism configured to variably change the compression ratio of the internal combustion engine in the first embodiment, this actuator may be employed for a link mechanism for a variable valve timing mechanism configured to variably change actuation timing of an intake valve or an exhaust valve.

Technical ideas obtained from the embodiments described above are listed below.

In one mode, an actuator for a link mechanism for an internal combustion engine, which is configured to rotate a control shaft configured to change a posture of the link mechanism of the internal combustion engine, includes: a wave gear type speed reducer configured to reduce a rotation speed of an electric motor, and to transmit the rotation speed to the control shaft; and a housing to which the electric motor and the wave gear type speed reducer are fixed, the wave gear type speed reducer including: a wave generating device having an ellipsoidal-shaped contour coupled to an output shaft of the electric motor; a flexible outer gear, which is configured to rotate integrally with the control shaft, has outer teeth formed on an outer periphery thereof, and includes a cylindrical portion that extends through an outer peripheral side of the wave generating device; an inner gear, which is fixed to the housing, has inner teeth meshed with the flexible outer gear, and is made of an iron-based metal material, the actuator including a stopper mechanism, which is provided to each of the inner gear and the control shaft, and is configured to restrict relative rotation of a predetermined amount or more when the inner gear and the control shaft are held in abutment against each other.

In a mode which is more preferred, in the above-mentioned mode, the stopper mechanism includes: a first member, which is provided on the inner gear, and extends in a rotation axis direction of the electric motor and toward the control shaft side; and a second member, which is provided on the control shaft, and is held in abutment against the first member when an amount of the relative rotation is the predetermined amount or more. In another preferred mode, in any of the above-mentioned modes, the first member overlaps with the cylindrical portion of the flexible outer gear as viewed form a radially outer side of the control shaft. In still another preferred mode, in any of the above-mentioned modes, the link mechanism for an internal combustion engine is a compression rate variable device that is capable of changing stroke characteristics of a piston by a multi-link type piston-crank mechanism.

In still another preferred mode, in any of the above-mentioned modes, the first member is formed integrally with the inner gear.

In still another preferred mode, in any of the above-mentioned modes, the first member is formed separately from the inner gear, and is fixed to the inner gear.

In still another preferred mode, in any of the above-mentioned modes, the second member is an extending portion that extends radially outward from the control shaft, and has a radially outer side that extends toward the motor side in the rotation axis direction of the electric motor.

In still another preferred mode, in any of the above-mentioned modes, the inner gear is fixed to the housing with a plurality of bolts.

In still another preferred mode, in any of the above-mentioned modes, the housing is made of an aluminum-based metal material.

Further, in another aspect, in one mode, an actuator for a link mechanism for an internal combustion engine, includes: a control shaft configured to change a posture of the link mechanism for an internal combustion engine through rotation, a wave gear type speed reducer configured to reduce a rotation speed of an electric motor, and to transmit the rotation speed to the control shaft; a housing that axially supports the control shaft; and an abutment portion provided on the speed reducer side in a rotation axis direction of the control shaft, the wave gear type speed reducer including: a wave generating device having an ellipsoidal-shaped contour coupled to an output shaft of the electric motor; a flexible outer gear, which is configured to rotate integrally with the control shaft, has outer teeth formed on an outer periphery thereof, and includes a cylindrical portion that extends through an outer peripheral side of the wave generating device; an inner gear, which is fixed to the housing, and has inner teeth meshed with the flexible outer gear; and a first member, which is provided on the inner gear; and a second member, which is provided on the control shaft, extends in an axial direction of the control shaft and toward the inner gear side, and is held in abutment against the first member when an amount of relative rotation is a predetermined amount or more.

In the above-mentioned mode, it is preferred that the first member be provided on the inner gear, and extends in an axial direction of the control shaft and toward the control shaft side.

In still another preferred mode, in any of the above-mentioned modes, the first member overlaps with the cylindrical portion of the flexible outer gear as viewed form a radially outer side of the control shaft.

In still another preferred mode, in any of the above-mentioned modes, the link mechanism for an internal combustion engine is a compression rate variable device that is capable of changing stroke characteristics of a piston by a multi-link type piston-crank mechanism.

Description has been given of only some embodiments of the present invention, but it is readily understood by a person skilled in the art that various changes and improvements can be made to the exemplified embodiments without practically departing from the novel teachings and advantages of the present invention. Thus, forms to which such changes and improvements are made are also intended to be included in the technical scope of the present invention.

The present application claims a priority based on Japanese Patent Application No. 2016-26513 filed on Feb. 16, 2016. All disclosed contents including Specification, Scope of Claims, Drawings, and Abstract of Japanese Patent Application No. 2016-26513 filed on Feb. 16, 2016 are incorporated herein by reference in their entirety.

All disclosed contents including Specification, Scope of Claims, Drawings, and Abstract of Japanese Patent Application No. 2011-169152 (Patent Literature 1) are incorporated herein by reference in their entirety.

REFERENCE SIGNS LIST 1 piston
3 upper link
4 crankshaft
4a crank pin
5 lower link
7 control link
9 coupling mechanism
10 first control shaft
21 wave gear type speed reducer
22 drive motor
23 shaft portion main body
24 stopper engagement portion
27 inner gear
27a inner teeth
36 flexible outer gear
37 wave generating device
45 motor casing
48 motor drive shaft
271 stopper

The invention claimed is:

1. An actuator for a link mechanism for an internal combustion engine, the actuator being configured to rotate a control shaft configured to change a posture of the link mechanism of the internal combustion engine,
the actuator comprising:
a wave gear type speed reducer configured to reduce a rotation speed of an electric motor, and to transmit the rotation speed to the control shaft; and
a housing to which the electric motor and the wave gear type speed reducer are fixed,
the wave gear type speed reducer including:
a wave generating device having an ellipsoidal-shaped contour coupled to an output shaft of the electric motor;
a flexible outer gear, which is configured to rotate integrally with the control shaft, has outer teeth formed on an outer periphery thereof, and includes a cylindrical portion that extends through an outer peripheral side of the wave generating device;
an inner gear, which is fixed to the housing, has inner teeth meshed with the flexible outer gear, and is made of an iron-based metal material,
the actuator including a stopper mechanism, which is provided to each of the inner gear and the control shaft, and is configured to restrict relative rotation of a predetermined amount or more when the inner gear and the control shaft are held in abutment against each other.

2. An actuator for a link mechanism for an internal combustion engine according to claim 1, wherein the stopper mechanism includes:
a first member, which is provided on the inner gear, and extends in a rotation axis direction of the electric motor and toward the control shaft side; and
a second member, which is provided on the control shaft, and is held in abutment against the first member when an amount of the relative rotation is the predetermined amount or more.

3. An actuator for a link mechanism for an internal combustion engine according to claim 2, wherein the first member overlaps with the cylindrical portion of the flexible outer gear as viewed form a radially outer side of the control shaft.

4. An actuator for a link mechanism for an internal combustion engine according to claim 3, wherein the first member includes:
a stopper reinforcing portion that extends in an axial direction in a predetermined angular range of the inner gear; and
a stopper that extends in the axial direction from the stopper reinforcing portion, against which the second member is held in abutment.

5. An actuator for a link mechanism for an internal combustion engine according to claim 4, wherein the stopper reinforcing portion is formed in an angular range wider than the stopper.

6. An actuator for a link mechanism for an internal combustion engine according to claim 5, wherein step differences are formed on both sides of the stopper in a circumferential direction by the stopper reinforcing portion and the stopper.

7. An actuator for a link mechanism for an internal combustion engine according to claim 5, wherein the stopper has a thread hole through which a bolt for fixing the inner gear to the housing is inserted.

8. An actuator for a link mechanism for an internal combustion engine according to claim 3, wherein the link mechanism for the internal combustion engine is a compression rate variable device that is capable of changing stroke characteristics of a piston by a multi-link type piston-crank mechanism.

9. An actuator for a link mechanism for an internal combustion engine according to claim 3, wherein the first member is formed integrally with the inner gear.

10. An actuator for a link mechanism for an internal combustion engine according to claim 3, wherein the first member is formed separately from the inner gear.

11. An actuator for a link mechanism for an internal combustion engine according to claim 3, wherein the second member is an extending portion that extends radially outward from the control shaft, and has a radially outer side that extends toward the motor side in the rotation axis direction of the electric motor.

12. An actuator for a link mechanism for an internal combustion engine according to claim 2, wherein the housing is made of an aluminum-based metal material.

13. An actuator for a link mechanism for an internal combustion engine,
the actuator comprising:
a control shaft configured to change a posture of the link mechanism for the internal combustion engine through rotation,
a wave gear type speed reducer configured to reduce a rotation speed of an electric motor, and to transmit the rotation speed to the control shaft;
a housing that axially supports the control shaft; and
an abutment portion provided on the speed reducer side in a rotation axis direction of the control shaft,
the wave gear type speed reducer including:
a wave generating device having an ellipsoidal-shaped contour coupled to an output shaft of the electric motor;
a flexible outer gear, which is configured to rotate integrally with the control shaft, has outer teeth formed on an outer periphery thereof, and includes a cylindrical portion that extends through an outer peripheral side of the wave generating device;
an inner gear made of an iron-based metal material, which is fixed to the housing, and has inner teeth meshed with the flexible outer gear; and
a first member, which is provided on the inner gear; and
a second member, which is provided on the control shaft, extends in an axial direction of the control shaft and toward the inner gear side, and is held in abutment against the first member when an amount of relative rotation is a predetermined amount or more.

14. An actuator for a link mechanism for an internal combustion engine according to claim 13, wherein the first member is provided on the inner gear, and extends in an axial direction of the control shaft and toward the control shaft side.

15. An actuator for a link mechanism for an internal combustion engine according to claim 14, wherein the first member overlaps with the cylindrical portion of the flexible outer gear as viewed form a radially outer side of the control shaft.

* * * * *